US010679507B2

(12) United States Patent
Fujishima et al.

(10) Patent No.: US 10,679,507 B2
(45) Date of Patent: Jun. 9, 2020

(54) PARKING SUPPORT SYSTEM, PARKING SUPPORT METHOD AND PROGRAM

(71) Applicants: MITSUBISHI HEAVY INDUSTRIES, LTD., Tokyo (JP); MITSUBISHI JIDOSHA KOGYO KABUSHIKI KAISHA, Tokyo (JP)

(72) Inventors: Yasuo Fujishima, Tokyo (JP); Yusuke Kinouchi, Tokyo (JP); Satoshi Iio, Tokyo (JP); Tetsuya Tomonaka, Tokyo (JP); Kevin Walters, Tokyo (JP)

(73) Assignees: MITSUBISHI HEAVY INDUSTRIES, LTD., Tokyo (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 16/068,264

(22) PCT Filed: Jan. 12, 2017

(86) PCT No.: PCT/JP2017/000821
§ 371 (c)(1),
(2) Date: Jul. 5, 2018

(87) PCT Pub. No.: WO2017/122723
PCT Pub. Date: Jul. 20, 2017

(65) Prior Publication Data
US 2019/0027042 A1 Jan. 24, 2019

(30) Foreign Application Priority Data
Jan. 12, 2016 (JP) .................................. 2016-003408

(51) Int. Cl.
*G08G 1/16* (2006.01)
*B60W 30/06* (2006.01)
(Continued)

(52) U.S. Cl.
CPC ............. *G08G 1/168* (2013.01); *B60R 21/00* (2013.01); *B60W 30/06* (2013.01);
(Continued)

(58) Field of Classification Search
CPC ...... B60R 21/00; B60W 30/06; B62D 15/027; B62D 15/0285; G05D 1/0225; G08G 1/149; G08G 1/168
See application file for complete search history.

(56) References Cited

U.S. PATENT DOCUMENTS 7,970,535 B2 * 6/2011 Katoh .................. G07C 5/0858
348/119
8,205,704 B2 * 6/2012 Kadowaki .......... B62D 15/0285
180/199

(Continued)

FOREIGN PATENT DOCUMENTS

DE        100 30 449       1/2001
DE      10 2004 057 797    6/2006
(Continued)

OTHER PUBLICATIONS

International Search Report dated Apr. 18, 2017 in International (PCT) Application No. PCT/JP2017/000821.
(Continued)

*Primary Examiner* — Tyler J Lee
(74) *Attorney, Agent, or Firm* — Wenderoth, Lind & Ponack, L.L.P.

(57) ABSTRACT

A parking support system includes a parking path planning unit that plans a trajectory of each unit path when moving a vehicle to a target parking position by repeating a movement of the unit path including one forward movement and one backward movement in succession and calculates a vehicle control signal that causes the vehicle to move along the trajectory such that a steering angle of the vehicle is sub-
(Continued)

stantially 0 degrees at an arrival position of each of the forward movement and the backward movement.

14 Claims, 9 Drawing Sheets

(51) Int. Cl.
*B62D 15/02* (2006.01)
*B60R 21/00* (2006.01)
*G08G 1/14* (2006.01)
*G05D 1/02* (2020.01)

(52) U.S. Cl.
CPC ....... *B62D 15/027* (2013.01); *B62D 15/0285* (2013.01); *G05D 1/0225* (2013.01); *G08G 1/149* (2013.01)

(56) References Cited

U.S. PATENT DOCUMENTS

| | | | |
|---|---|---|---|
| 2005/0027415 A1 | 2/2005 | Iwazaki | |
| 2006/0271278 A1* | 11/2006 | Sakakibara | B62D 15/0275 701/523 |
| 2009/0312912 A1* | 12/2009 | Braegas | B60T 7/22 701/42 |
| 2010/0049402 A1 | 2/2010 | Tanaka | |
| 2010/0219010 A1* | 9/2010 | Kadowaki | B62D 15/0285 180/204 |
| 2011/0298639 A1 | 12/2011 | Kadowaki et al. | |
| 2013/0166190 A1 | 6/2013 | Ikeda et al. | |
| 2016/0137197 A1* | 5/2016 | Hayakawa | B60K 26/04 701/70 |
| 2016/0144858 A1* | 5/2016 | Burtsche | B60W 10/18 701/23 |
| 2018/0345955 A1* | 12/2018 | Kim | B60W 30/06 |

FOREIGN PATENT DOCUMENTS

| | | |
|---|---|---|
| EP | 2 202 132 | 6/2010 |
| JP | 11-198843 | 7/1999 |
| JP | 2005-014776 | 1/2005 |
| JP | 2008-284969 | 11/2008 |
| JP | 2009-012521 | 1/2009 |
| WO | 2010/098216 | 9/2010 |
| WO | 2012/143033 | 10/2012 |

OTHER PUBLICATIONS

Written Opinion of the International Searching Authority dated Apr. 18, 2017 in International (PCT) Application No. PCT/JP2017/000821.

* cited by examiner

PARKING SUPPORT SYSTEM, PARKING SUPPORT METHOD AND PROGRAM

TECHNICAL FIELD

The present invention relates to a parking support system, a parking support method, and a program.

Priority is claimed on Japanese Patent Application No. 2016-003408, filed Jan. 12, 2016, the content of which is incorporated herein by reference.

BACKGROUND ART

Technological development of driving support or automatic driving for automating a part of vehicle driving has been actively conducted in recent years. Various technologies for supporting driving have been proposed particularly with regard to "parking" which is a limited situation of driving. For example, Patent Document 1 discloses a parking support apparatus that calculates a backward path for moving a vehicle to a target parking position by one backward movement and guides the vehicle along the path.

CITATION LIST

Patent Literature

[Patent Document 1]
Japanese Unexamined Patent Application, First Publication No. 2008-284969

SUMMARY OF INVENTION

Technical Problem

In general, two pieces of information, a front wheel steering angle (steering wheel rotation angle) and a vehicle speed, are often input to a vehicle during driving support or automatic driving of the vehicle. In the parking support/automatic parking systems of the related art including that of Patent Document 1, constraint conditions of various hardware components of the vehicle are not taken into consideration in many cases. The constraint conditions of various hardware components are, for example, the maximum value of the steering torque, the maximum steering angle for steering, and the maximum value of the angular velocity at which the steering angle is changed. For example, it is not possible for a vehicle with a small maximum steering torque to perform stationary turning (move only the front wheels on the spot without moving the vehicle). If a method such as that of Patent Document 1 is used for such a vehicle, there is a possibility of the vehicle being unable to follow a planned path because it is not possible to perform stationary turning at the time of turning back.

The present invention provides a parking support system, a parking support method, and a program which can solve the problems described above.

Solution to Problem

According to a first aspect of the present invention, a parking support system includes a parking path planning unit configured to plan a trajectory of each unit path when moving a vehicle to a target parking position by repeating a movement of the unit path including one forward movement and one backward movement in succession and to calculate a vehicle control signal that causes the vehicle to move along the trajectory such that a steering angle of the vehicle is substantially 0 degrees at an arrival position of each of the forward movement and the backward movement.

According to a second aspect of the present invention, the vehicle control signal may include a control signal to keep the steering angle constant after increasing the steering angle from a predetermined angle and then to decrease the steering angle to substantially 0 degrees in steering angle control of the forward movement and the backward movement of the unit path.

According to a third aspect of the present invention, the parking support system may further include an entry detector configured to detect entry of the unit path into an entry prohibited area, wherein the parking path planning unit is configured to change, when the entry detector has detected the entry into the entry prohibited area, the trajectory of the unit path to a trajectory for stopping immediately before entering the entry prohibited area and to change the vehicle control signal such that the steering angle of the vehicle at a stop position immediately before the entry prohibited area in the changed unit path is substantially 0 degrees.

According to a fourth aspect of the present invention, in the parking support system, the parking path planning unit may be configured to recalculate, when the entry detector has detected the entry into the entry prohibited area, the trajectory of the unit path changed on the basis of the vehicle control signal changed and to repeat changing of the vehicle control signal until the entry detector determines that the recalculated trajectory does not enter the entry prohibited area.

According to a fifth aspect of the present invention, the parking path planning unit may be configured to calculate the unit path and the vehicle control signal on the basis of a performance value of hardware at a time of automatic driving of the vehicle.

According to a sixth aspect of the present invention, the parking path planning unit may be configured to calculate a plurality of candidate unit paths in cases where the vehicle is moved within a range of upper and lower limit values of the performance value of the hardware at the time of automatic driving of the vehicle and to select a unit path with position information of an arrival position of the unit path being closest to the target parking position from the plurality of unit paths.

According to a seventh aspect of the present invention, the parking support system may further include an abnormality detector configured to detect an abnormality in a hardware component relating to the vehicle control signal among hardware components of the vehicle, wherein the parking path planning unit is configured to calculate the unit path and the vehicle control signal on the basis of a performance value of the hardware component at a time of the abnormality in the hardware component detected by the abnormality detector.

According to an eighth aspect of the present invention, the abnormality detector may be configured to detect that an abnormality has occurred in the hardware component on the basis of at least one of a deviation between a steering angle control signal included in the vehicle control signal and an actual steering angle and a deviation between a vehicle speed control signal and an actual vehicle speed being equal to or greater than a corresponding threshold value set for each of the deviations, and the parking path planning unit may be configured to calculate the unit path on the basis of a performance value of the hardware component at the time of the abnormality in the hardware component detected by the abnormality detector.

According to a ninth aspect of the present invention, the parking path planning unit may be configured to calculate the unit path using a parking start position, at which the number of times of turning back is reduced according to initial position guide information defining a relationship between the parking start position and the number of times of turning back, as a departure position.

According to a tenth aspect of the present invention, the parking support system further includes a progress status calculator configured to calculate a deviation between a position and attitude of the vehicle at the arrival position of the unit path and a position and attitude of the vehicle at the target parking position each time the vehicle completes movement according to the unit path.

According to an eleventh aspect of the present invention, the parking path planning unit may be configured to repeatedly plan a subsequent unit path having the arrival position of the unit path as a departure position until a difference between a position of the vehicle at an arrival position of a unit path and the target parking position is within a predetermined range and to calculate a parking path including one or a plurality of the unit paths.

According to a twelfth aspect of the present invention, a parking support system includes a parking path planning unit configured to generate a steering angle control signal for controlling change of a steering angle of a vehicle when moving the vehicle to a target parking position by repeating movement of a unit path including one forward movement and one backward movement in succession, wherein the parking path planning unit is configured to calculate a steering angle control signal including a trapezoidal waveform such that the steering angle in each of the forward movement and the backward movement starts at substantially 0 degrees and ends at substantially 0 degrees.

According to a thirteenth aspect of the present invention, a parking support system includes a parking path planning unit configured to plan a trajectory of each unit path when moving a vehicle to a target parking position by repeating a movement of the unit path including one forward movement and one backward movement in succession, wherein the parking path planning unit is configured to repeatedly plan a subsequent unit path having an arrival position of the unit path as a departure position until a difference between a position of the vehicle at an arrival position of a unit path and the target parking position is within a predetermined range.

A fourteenth aspect of the present invention is a parking support method including planning a trajectory of each unit path when moving a vehicle to a target parking position by repeating a movement of the unit path including one forward movement and one backward movement in succession and calculating a vehicle control signal for causing the vehicle to move along the trajectory such that a steering angle of the vehicle is substantially 0 degrees at an arrival position of each of the forward movement and the backward movement.

A fifteenth aspect of the present invention is a program causing a computer for a parking support system to function as a means to plan a trajectory of each unit path when moving a vehicle to a target parking position by repeating a movement of the unit path including one forward movement and one backward movement in succession and to calculate a vehicle control signal for causing the vehicle to move along the trajectory such that a steering angle of the vehicle is substantially 0 degrees at an arrival position of each of the forward movement and the backward movement.

Advantageous Effects of Invention

According to the parking support system, the parking support method and the program described above, it is possible to calculate a parking path taking into consideration hardware constraints. Therefore, automatic parking is possible even for vehicles with strong hardware constraints such as the inability to perform stationary turning.

DESCRIPTION OF EMBODIMENTS

First Embodiment

Hereinafter, a parking support system according to an embodiment of the present invention will be described with reference to FIGS. 1 to 9.

Figure 1:
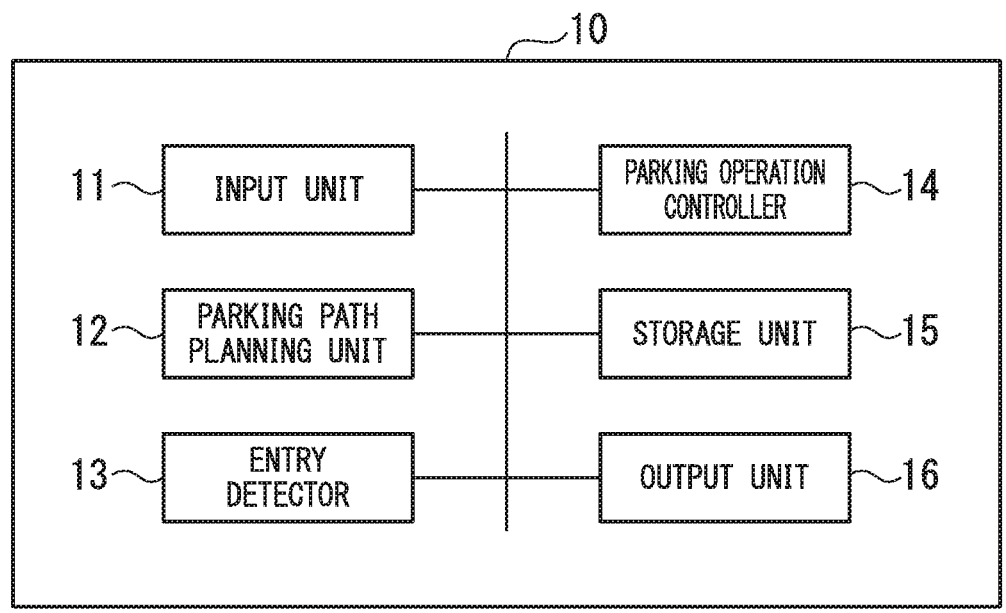
FIG. 1 is a block diagram of a parking support system according to a first embodiment of the present invention.

FIG. 1 is a block diagram of a parking support system according to the first embodiment of the present invention.

The parking support system 10 is a computer device mounted in a vehicle and supports automatic parking of the vehicle in which the parking support system 10 is mounted. The parking support system 10 includes an input unit 11, a parking path planning unit 12, an entry detector 13, a parking operation controller 14, a storage unit 15, and an output unit 16.

The input unit 11 acquires position information of a target parking position and attitude information of the vehicle when it is parked at the target parking position. The input unit 11 acquires current position information and attitude information of the vehicle. The input unit 11 acquires position information of an entry prohibited area present in a predetermined area including the current position of the vehicle or the target parking position.

The parking path planning unit 12 calculates a path (referred to as a parking path) for a vehicle from a parking start position until it reaches the target parking position and generates control signals (such as a steering angle and a vehicle speed) for operating the vehicle such that it moves along the parking path. In the present embodiment, a unit of movement including one forward movement and one backward movement in succession is referred to as a frame. The "frame" referred to here is synonymous with the unit path shown in the above description of the aspects of the present invention. The parking path planning unit 12 plans a parking method for moving the vehicle to the target parking position by repeating movement in units of frames. That is, the parking path includes one frame or a plurality of consecutive frames. The parking path planning unit 12 plans a trajectory of each frame. The parking path planning unit 12 generates a vehicle control signal for moving the vehicle along the trajectory of each frame. In particular, the parking path planning unit 12 generates a vehicle control signal such that the angle of the wheels (front wheels) of the vehicle is 0 degrees at the start position, the end position, and the turning back position of each frame. The vehicle control signal is a signal for controlling the movement of actuators of the vehicle relating to a parking operation.

The entry detector 13 determines whether or not the vehicle enters the entry prohibited area when the vehicle is moved along the trajectory of the frame.

The parking operation controller 14 outputs the vehicle control signal generated by the parking path planning unit 12 to each actuator relating to the parking operation of the vehicle.

The storage unit 15 stores the position information of the target parking position acquired by the input unit 11 or the like. The storage unit 15 stores information indicating the trajectory of the frame calculated by the parking path planning unit 12 or the like. The storage unit 15 stores hardware performance values such as a maximum value of the steering angle, upper and lower limit values of the vehicle speed of the vehicle, and upper and lower limits of the steering angular velocity.

The output unit 16 displays a notification of the start and completion of automatic parking on a display provided in the driver's seat of the vehicle or displays the progress status of automatic parking thereon.

The input unit 11, the parking path planning unit 12, the entry detector 13, the parking operation controller 14, and the output unit 16 are functions which are given to the parking support system 10 as a CPU in the parking support system 10 reads and executes a program stored in the storage unit 15.

Many parking support systems proposed so far are based upon the premise that a vehicle is moved from a parking start position to a target parking position with a single turn backward and thus parked. Such parking support systems of the related art are also often according to the premise that it is possible to perform the same operation as when a person drives, for example, with regard to the turning back operation of the steering wheel. However, a power steering system is installed on a general vehicle for the purpose of assisting the driver with a steering operation, and it is difficult to make the vehicle perform a steering operation equivalent to that when a person drives only with the power of the power steering system. Therefore, automatic driving using the power steering system may fail to steer through a curve that can be steered through if a person drives. Accordingly, if the parking methods provided by the parking support systems of the related art are to be implemented fully automatically, the performance of actuators or batteries of the vehicle must be high enough to perform the same operation as that of a person, and thus this is not suitable for general vehicles. Therefore, the present embodiment provides a parking support system which explicitly (or positively) considers vehicle hardware constraints and enables automatic parking even with the performance of hardware (such as actuators) of a general vehicle.

Some general vehicles cannot perform stationary turning (i.e., move only the wheels on the spot without moving the vehicle) for reasons such as a small maximum value of the steering angle torque. There is a possibility that such a vehicle cannot follow a path planned by the parking support system of the related art since stationary turning is not possible at the time of turning back. Therefore, in the present embodiment, the steering angle is controlled such that the steering angle of the wheels is 0 degrees at the time of turning back or the like.

Next, planning of the trajectory of each frame in the present embodiment will be described with reference to FIGS. 2 to 4. Among the trajectory of a frame including one forward movement and one backward movement in succession, a trajectory during forward movement is referred to as a first-half trajectory and a trajectory during backward movement is referred to as a second-half trajectory.

Figure 2:
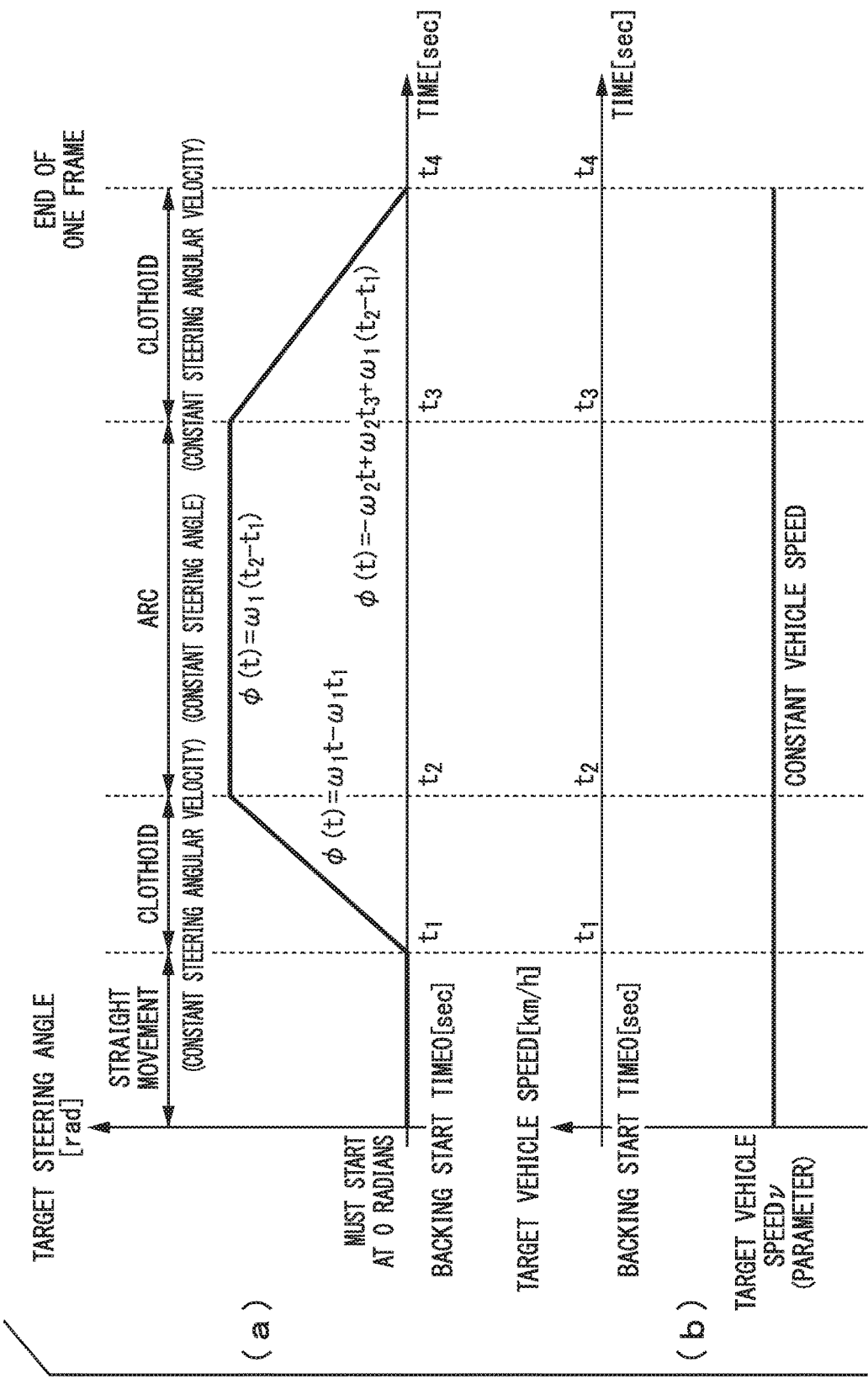
FIG. 2 is a diagram showing an example of a vehicle control signal according to the first embodiment of the present invention.

FIG. 2 is a diagram showing an example of a vehicle control signal according to the first embodiment of the present invention.

FIG. 2(a) shows the waveform of a signal for controlling the steering angle of the front wheels of the vehicle during backward movement of one frame. In FIG. 2(a), the vertical axis represents the angle (in radians) and the horizontal axis represents time. In the present embodiment, the steering angle is controlled such that the steering wheel is oriented toward the front at the times of starting and ending one frame and at the time of turning back in one frame (i.e., at the time of shifting between forward and backward) as described above, and therefore the steering angle in an initial state is 0 degrees. From time 0 to $t_1$, the steering angle is 0 degrees, and thus the vehicle moves on a straight line in this duration. From time $t_1$ to $t_2$, the steering angle increases at a constant angular velocity, and thus the vehicle moves on a clothoid curve in this duration. From time $t_2$ to $t_3$, the steering angle is constant, and thus the vehicle moves on an arc in this duration. From time $t_3$ to $t_4$, the steering angle decreases to 0 degrees at a constant angular velocity, and the vehicle stops at time $t_4$ while moving on a clothoid curve. At this time, the steering wheel is oriented toward the front (i.e., the steering angle is 0 degrees). Similarly, the waveform of a control signal for forward movement is a trapezoidal waveform such that the steering angle increases from 0 degrees, a predetermined target steering angle is maintained, and thereafter, from the turning back point, the steering angle decreases again to 0 degrees. The parking path planning unit 12 generates a steering angle control signal having the waveform exemplified in FIG. 2(a) for each of the forward operation and the backward operation of one frame.

As shown, the target steering angle $\phi(t)$ from time $t_1$ to $t_2$ can be expressed by $\phi(t)=\Omega_1 t - t_1$, the target steering angle $\phi(t)$ from time $t_2$ to $t_3$ can be expressed by $\phi=\omega_1(t_2-t_1)$, and the target steering angle $\phi(t)$ from time $t_3$ to $t_4$ can be expressed by $\phi(t)=-\omega_2 t + \omega_2 t_3 + \omega_1 (t_2-t_1)$. Here, t is the time, $\omega_1$ is the angular velocity at which the steering angle increases, and $\omega_2$ is the angular velocity at which the steering angle decreases.

FIG. 2(b) shows the waveform of a signal for controlling the speed of the vehicle during backward movement of one frame. In FIG. 2(b), the vertical axis represents the speed (km/h) and the horizontal axis represents time. In the example of FIG. 2(b), the speed of the vehicle is constant, which is a negative value for backward movement. The speed is not particularly limited, but may be constant for both forward and backward movement. The parking path planning unit 12 generates a vehicle speed control signal having the waveform exemplified in FIG. 2(b) for each of the forward operation and the backward operation of one frame. The vehicle speed may increase/decrease or may be constant. The present embodiment will be described with reference to the case in which the vehicle speed is constant as an example. The vehicle control signal includes the steering angle control signal and the vehicle speed control signal.

The storage unit 15 stores performance values defining the maximum steering angle of the vehicle, the upper and lower limit values of the steering angular velocity, and the upper and lower limit values of the vehicle speed. Information of these upper and lower limits is not that of performance values that can be achieved by a person's operation, but that of performance values that can be output by actuators only during automatic driving. The parking path planning unit 12 reads these performance values from the storage unit 15 and generates control signals for moving the vehicle forward and backward within the range of the read performance values.

Figure 3:
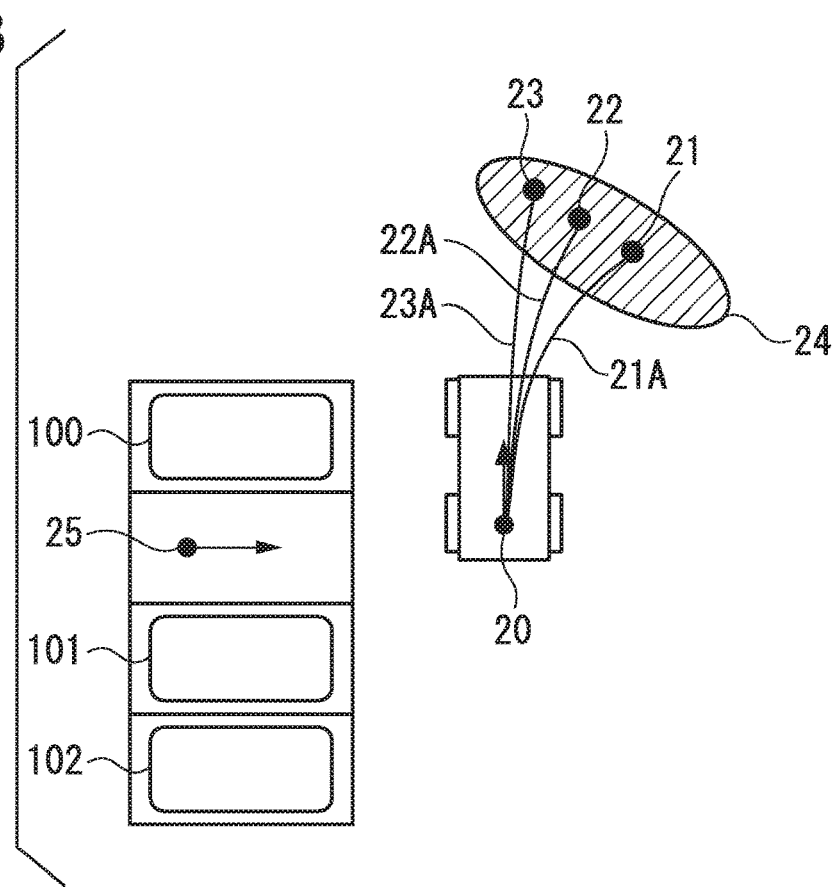
FIG. 3 is a diagram showing a planning method of a first-half trajectory of one frame according to the first embodiment of the present invention.

FIG. 3 is a diagram showing a method of planning a first-half trajectory of one frame according to the first embodiment of the present invention.

The parking path planning unit 12 sets values in appropriate ranges for parameters including the maximum steering angle or steering angular velocity read from the storage unit 15 and the period of time $t_1$ to $t_2$, the period of time $t_2$ to $t_3$, and the period of time $t_3$ to $t_4$ exemplified in FIG. 2(a) and generates a plurality of patterns of steering angle control signals during forward movement of one frame. The parking path planning unit 12 selects an appropriate speed V within the range of the upper and lower limit values of the vehicle speed read from the storage unit 15 and generates, according to the period of time from the start to stop of forward movement defined by each steering angle control signal, a vehicle speed control signal instructing that the vehicle move forward over the period of time at the speed V. The parking path planning unit 12 pairs each of the plurality of generated steering angle control signals with a corresponding vehicle speed control signal and calculates a trajectory, position information of an arrival position, and attitude information at the arrival position in the case of moving the vehicle forward with the vehicle control signal. The position information of the arrival position is, for example, coordinate information of a predetermined position (for example, the center of both rear wheels) of the vehicle when the vehicle has reached the arrival position in a coordinate system in which the predetermined position of the vehicle at a parking start position 20 is the origin, an X axis is set in the travel direction of the vehicle, and a Y axis is set in the lateral direction of the vehicle. The attitude information at the arrival position is an angle formed by the orientation of the vehicle when it has reached the arrival position with respect to the orientation of the vehicle at the parking start position 20. First-half trajectories 21A to 23A in FIG. 3 indicate trajectories of the vehicle according to a plurality of patterns of vehicle control signals with the parking start position 20 as a departure position. First-half trajectory arrival positions 21 to 23 in FIG. 3 indicate arrival positions when the vehicle is moved forward on the basis of the plurality of patterns of vehicle control signals. For example, coordinate information defining a region 24 indicating an allowable range of desirable turning back positions according to the positional relationship between the parking start position 20 and a target parking position 25 may be recorded in the storage unit 15 in advance, and the parking path planning unit 12 may determine first-half trajectories such that an arrival position of each of the first-half trajectories at which the vehicle will arrive on the basis of a steering angular velocity, a vehicle speed, and the like arbitrarily set within the performance range is included in the region 24, as candidate first-half trajectories. When simulating a large number of such first-half trajectories and then determining a plurality of (for example, ten patterns of) candidate first-half trajectories among them, the parking path planning unit 12 calculates second-half trajectories and plans a trajectory of one frame in the parking path for moving the vehicle to the target parking position 25. Vehicles 100 to 102 are already parked in parking spaces around the target parking position 25.

Figure 4:
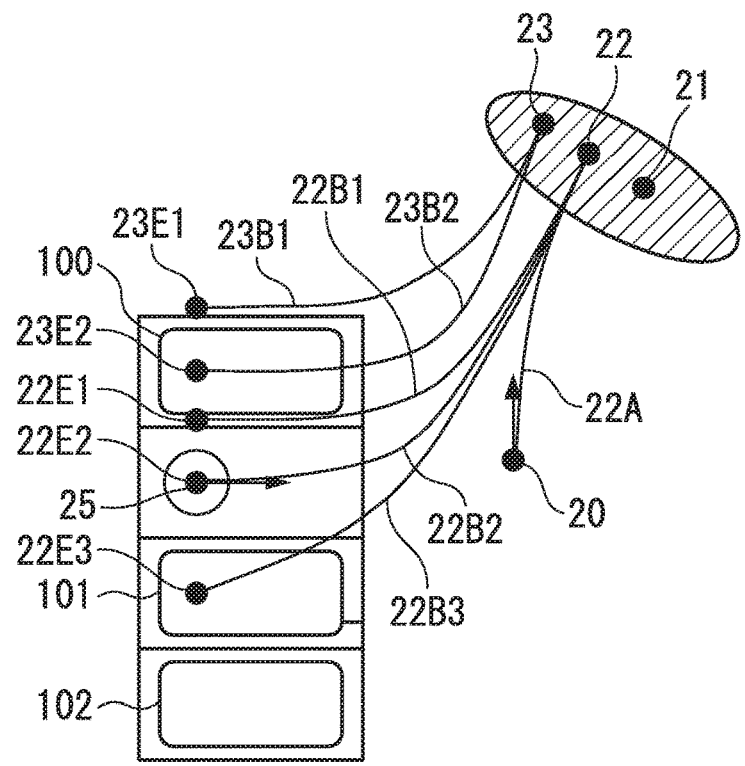
FIG. 4 is a diagram showing a method of planning a second-half trajectory of one frame according to the first embodiment of the present invention.

FIG. 4 is a diagram showing a method of planning a second-half trajectory of one frame according to the first embodiment of the present invention.

The parking path planning unit 12 calculates a plurality of patterns of second-half trajectories for a departure position using each of first-half trajectory arrival positions 21 to 23 calculated in the planning of the first-half trajectory as the departure position. For example, the parking path planning unit 12 arbitrarily sets a maximum steering angle, a period of time from the state in which the steering angle is 0 degrees until it reaches the maximum steering angle, a period of time in which to maintain the maximum steering angle, a period of time until returning the steering angle to 0 degrees from the maximum steering angle, a speed of the vehicle during backward movement, or the like within the ranges of performance values, and calculates a plurality of second-half trajectories using the first-half trajectory arrival position 23 as a departure position. Second-half trajectories 23B1 and 23B2 are examples of the second-half trajectories calculated by the parking path planning unit 12 in this way. Similar to the first-half trajectories, the parking path planning unit 12 may select only second-half trajectories such that an arrival position of each of the second-half trajectories (i.e., the arrival position of one frame) is included in a predetermined region. Similarly, the parking path planning unit 12 simulates a plurality of candidate second-half trajectories (for example, second-half trajectories 22B1 to 22B3) having the first-half trajectory arrival position 22 as a departure position. The parking path planning unit 12 performs the same processing for the first-half trajectory arrival position 21. The parking path planning unit 12 calculates position information of an arrival position of the vehicle and attitude information at the arrival position for each of the plurality of second-half trajectories. Next, the parking path planning unit 12 compares distances between the calculated arrival positions (for example, arrival positions 23E1, 23E2, 22E1, 22E2, and 22E3) of the second-half trajectories and the target parking position 25 and selects an arrival position closest to the target parking position 25. In the example of FIG. 4, the arrival position 22E2 is closest to the target parking position 25. The parking path planning unit 12 selects the second-half trajectory corresponding to the selected arrival position and the first-half trajectory connected to the second-half trajectory and determines them as trajectories of one frame. In the examples of FIGS. 3 and 4, the parking path planning unit 12 determines the combination of the first-half trajectory 22A and the second-half trajectory 22B2 as one frame. In the examples shown in FIGS. 3 and 4, the vehicle moves from the parking start position 20 to the target parking position 25 in one frame. However, when the vehicle cannot arrive at the target parking position 25 in one frame, for example, the calculation of first- and second-half trajectories described with reference to FIGS. 3 and 4 is repeated each time movement of one frame is completed, thus repeating the movement over a plurality of frames to perform movement to the target parking position 25.

Figure 5:
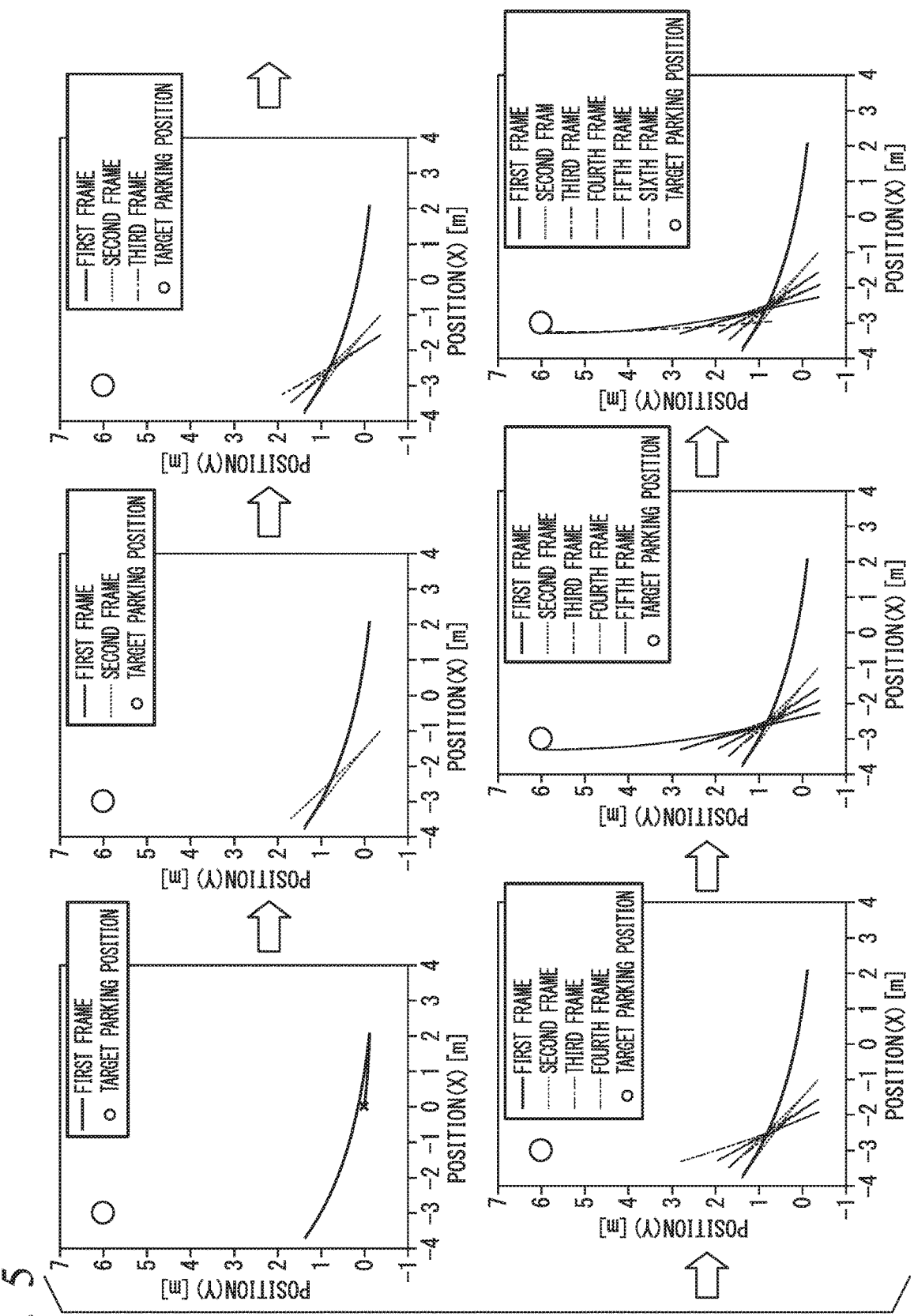
FIG. 5 is a diagram showing an example of a parking path according to the first embodiment of the present invention.

FIG. 5 is a diagram showing an example of a parking path according to the first embodiment of the present invention.

In each view of FIG. 5, the origin of (X, Y)=(0, 0) represents a parking start position and (X, Y)=(−3, 6) represents a target parking position. When the vehicle is stopped at the parking start position, the parking support system 10 starts fully-automatic parking support in response to an automatic parking start instruction operation of the driver. First, the parking path planning unit 12 plans a trajectory of a first frame from the parking start position. The specific planning method is as described above with reference to FIGS. 3 and 4. By planning the trajectory, the waveform or the like of a steering angle control signal is determined and an arrival position or attitude information of the trajectory is calculated. The parking path planning unit 12 outputs a vehicle control signal necessary to move the vehicle with the planned trajectory of the first frame to the parking operation controller 14. The vehicle control signal includes a steering angle control signal for forward movement, a vehicle speed control signal for forward movement, a steering angle control signal for backward movement, and a vehicle speed control signal for backward movement. The parking operation controller 14 operates the power steering system on the basis of the steering angle control signal for forward movement to control the steering angle of the front wheels. The parking operation controller 14 controls a wheel drive mechanism on the basis of the vehicle speed control signal for forward movement to move the vehicle forward at a predetermined speed. Thus, the vehicle moves on the first-half trajectory, reaching a turning back position. According to the steering angle control signal of the present embodiment, the steering angle of the front wheels upon arrival at the turning back position is about 0 degrees as described above with reference to FIG. 2. Therefore, it is possible to realize the vehicle's smooth following to the second-half trajectory without performing stationary turning when moving in the second half of one frame. Upon arrival at the turning back position, the parking operation controller 14 moves the vehicle backward on the basis of the vehicle control signal for backward movement.

When movement of the first frame is completed, the parking path planning unit 12 plans a trajectory of a second frame using a final arrival position of the first frame (i.e., the arrival position of the second-half trajectory of the first frame) as a departure position. The parking operation controller 14 moves the vehicle forward and backward on the basis of a vehicle control signal of the second frame (see an upper center view of FIG. 5). Also at this time, the steering angle of the front wheels is controlled such that it is 0 degrees upon completion of the first frame and therefore the vehicle can smoothly follow the first-half trajectory of the second frame without performing stationary turning. Similarly, the parking support system 10 plans and performs movement of a third frame (see an upper right view of FIG. 5), movement of a fourth frame (see a lower left view of FIG. 5), movement of a fifth frame (see a lower center view of FIG. 5), and movement of a sixth frame (see a lower right view of FIG. 5). Each time movement of one frame is completed, the distance to the target parking position is checked to determine whether or not to end the automatic parking. In this example, the parking path planning unit 12 compares the distance between a final arrival position of the sixth frame and the target parking position and determines that the vehicle has arrived at the target parking position on the basis of the distance being within a predetermined range, and the output unit 16 notifies the driver of the completion of the automatic parking support. According to the vehicle control signal exemplified in FIG. 2, the vehicle moves on a smooth path combining a clothoid curve and an arc. Between frames or at a turning back position between forward and backward movement in one frame, the steering wheel is oriented toward the front and thus it is unnecessary to perform stationary turning in a series of parking paths. Therefore, no load is imposed on the vehicle body and the control system, and occupants can also ride with psychological comfort. Since the vehicle reaches the target parking position by performing turning back a plurality of times, even general vehicles equipped with no high-performance actuators can perform automatic parking through movement of a plurality of frames.

Next, processing when a planned trajectory of one frame interferes with an entry prohibited area will be described.

Figure 6:
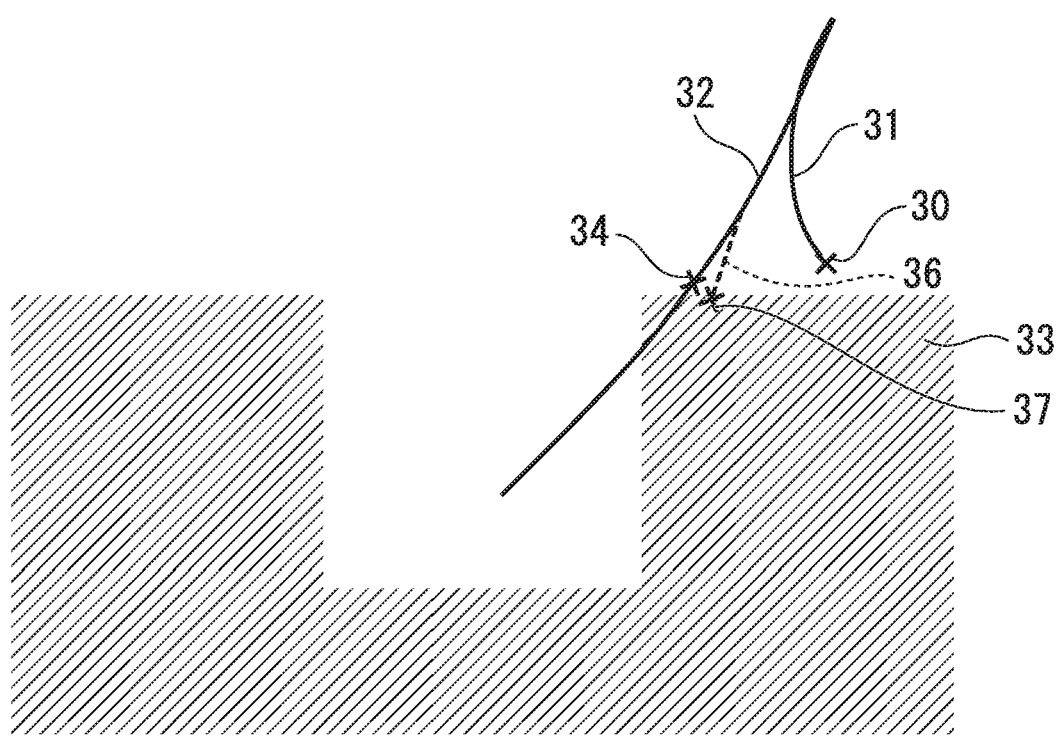
FIG. 6 is a diagram showing an example in which a parking path according to the first embodiment of the present invention interferes with an entry prohibited area.

FIG. 6 is a diagram showing an example in which a parking path according to the first embodiment of the present invention interferes with an entry prohibited area.

A hatched area in FIG. 6 is an entry prohibited area 33. It is assumed that, in the parking support system 10 mounted in a vehicle located at a position 30, the parking path planning unit 12 has calculated a trajectory of one frame including a first-half trajectory 31 and a second-half trajectory 32. In this case, the second-half trajectory 32 interferes with the entry prohibited area 33. Therefore, the vehicle will enter the entry prohibited area 33 unless the second-half trajectory 32 is corrected. In this case, the entry detector 13 detects entry of the second-half trajectory 32 into the entry prohibited area 33 and the parking path planning unit 12 corrects the trajectory of the second-half trajectory 32. Specifically, the parking path planning unit 12 corrects the second-half trajectory 32 such that it ends immediately before the entry prohibited area 33 (for example, at a position 34). Then, the parking path planning unit 12 plans a frame again using the position 34 as a departure position and continues the movement to the target parking position. Such correction prevents entry of the vehicle into the entry prohibited area 33 and allows the vehicle to be parked at the target parking position.

For example, determining the time at which the vehicle arrives at the position 34 of the second-half trajectory 32 and generating a new vehicle control signal to terminate the vehicle control signal corresponding to the second-half trajectory 32 at the time of arriving at the position 34 will be considered. In this case, it is conceivable that the steering angle at the time of arriving at the position 34 according to the vehicle control signal which has already been calculated is not 0 degrees. Specifically, in the example of FIG. 2(a), it is conceivable that the steering angle at the time of arriving at the position 34 corresponds to a time zone in which the steering angle increases or decreases at a constant steering angular velocity or a time zone in which the steering angle is constant. Then, when the vehicle is stopped at the position 34, the front wheel steering angle of the vehicle is not 0 degrees, which requires stationary turning before the next forward movement or causes wasteful operations in which it is necessary to greatly turn the steering angle of the front wheels to the opposite side during forward movement of the next frame. There is a possibility that such operations are not executable on vehicles having insufficient performance.

Therefore, in the present embodiment, upon detecting entry into the entry prohibited area 33, not only is the trajectory corrected to prevent entry into the entry prohibited area 33 but the steering angle control signal is also corrected such that the steering angle of the wheels at the arrival position in the corrected trajectory is 0 degrees. Next, an exemplary correction of the steering angle control signal will be described with reference to FIG. 7.

Figure 7:
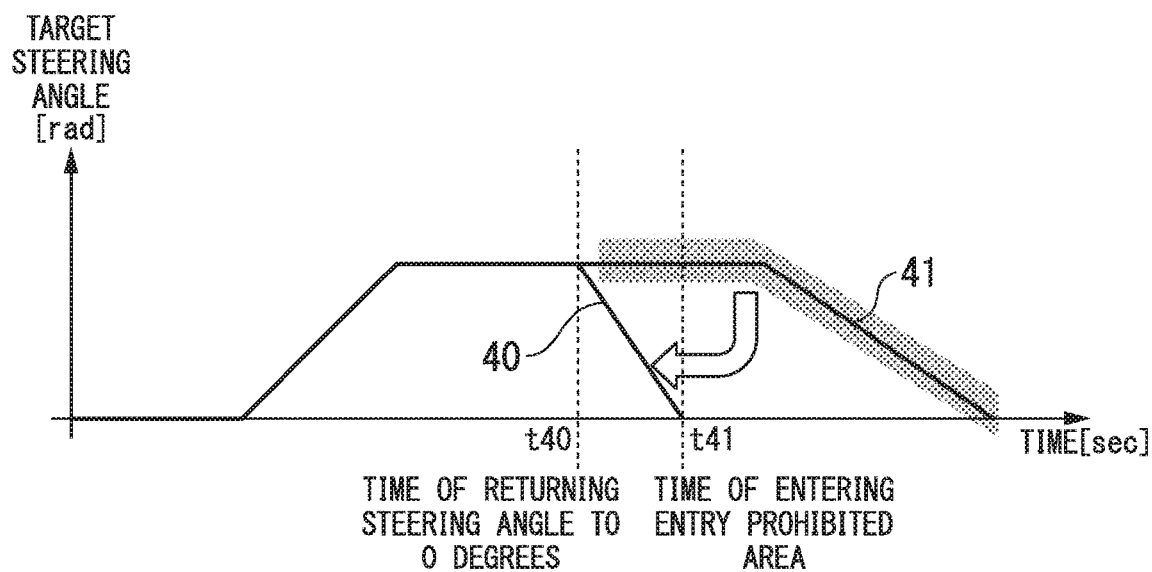
FIG. 7 is a first diagram showing a method of correcting a trajectory according to the first embodiment of the present invention.

FIG. 7 is a first diagram showing a method of correcting a trajectory according to the first embodiment of the present invention.

Figure 8:
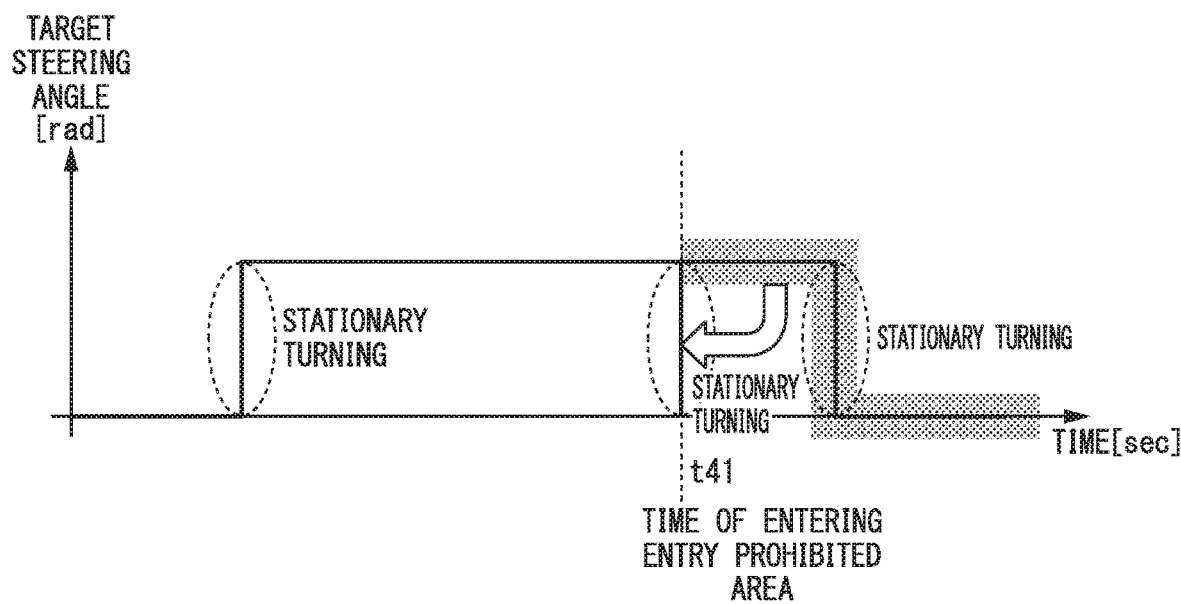
FIG. 8 is a second diagram showing a method of correcting a trajectory according to the first embodiment of the present invention.

FIG. 8 is a second diagram showing the method of correcting a trajectory according to the first embodiment of the present invention.

A steering angle control signal 41 indicates a waveform of a steering angle control signal of a second-half trajectory generated by the parking path planning unit 12. When the entry detector 13 has detected entry of the vehicle into the entry prohibited area at time t41, the parking path planning unit 12 corrects the steering angle control signal 41, for example, into the waveform of a steering angle control signal 40. The parking path planning unit 12 corrects the waveform of a vehicle speed control signal (not shown) such that it is zero at time t41. The parking path planning unit 12 corrects the steering angle control signal taking into consideration the maximum value of the steering angular velocity which is a hardware constraint condition. Here, a method of correcting a steering angle control signal in a vehicle that can perform stationary turning will be described using FIG. 8. In vehicles that can perform stationary turning, a simple stepwise waveform as exemplified in FIG. 8 can be given as a command value. This waveform indicates control of moving the vehicle forward or backward while keeping the steering angle of the front wheels constant, stopping the vehicle immediately before the entry prohibited area, and performing stationary turning to bring the steering angle to 0 degrees. Such an operation is possible in a vehicle having a high-performance actuator for controlling the steering angle. However, in a general vehicle, even if a steering angle control signal as shown in FIG. 8 is given, the front wheels cannot be turned as the steering angle control signal and the front wheel steering angle at the time of stopping immediately before the entry prohibited area does not return to 0 degrees. Therefore, in the present embodiment, the steering angle is changed sequentially from before reaching the stop position which is immediately before the entry prohibited area such that the waveform as shown in FIG. 7 is generated to ensure applicability to vehicles in which stationary turning is impossible or difficult.

Incidentally, as shown in FIG. 7, the trajectory of the vehicle when the vehicle is stopped at time t41 with the second-half trajectory according to the steering angle control signal 41 and the vehicle speed control signal (not shown) given before correction differs from that of the second-half trajectory according to the corrected steering angle control signal 40 and the corrected vehicle speed control signal (not shown). This is because, with the corrected steering angle control signal 40, the vehicle moves backward while returning the steering angle of the front wheels to 0 degrees from time t40, such that the curve expands as compared with the trajectory before correction. This state is shown by a broken line in FIG. 6. The broken line 36 is an example of the second-half trajectory according to the corrected steering angle control signal 40 and the corrected vehicle speed control signal. An arrival position 37 is a position at which the vehicle arrives when it is moved backward and stopped on the basis of the corrected vehicle control signal. In this example, if the vehicle is moved backward on the basis of the corrected vehicle control signal, the vehicle will slightly enter the entry prohibited area when stopped. Entry as exemplified by the broken line 36 in FIG. 6 may occur, for example, if the parking path planning unit 12 calculates the time required to return the steering angle to 0 degrees at the maximum steering angular velocity and calculates the time t40 simply through back calculation of the calculated required time from the stop time t41. Therefore, the parking path planning unit 12 performs processing of adjusting back and forth the time t40 at which returning of the steering angle starts or adjusting the steering angular velocity when returning the steering angle, recalculating the path with the adjustment, and confirming that the vehicle does not enter the entry prohibited area when stopped.

For example, the parking path planning unit 12 calculates the time required to return the steering angle to 0 degrees at the maximum steering angular velocity and calculates the time t40 through back calculation of the calculated required time from the stop time t41. Then, the parking path planning unit 12 calculates a trajectory according to the corrected vehicle control signal. Next, the entry detector 13 determines whether or not the corrected trajectory passes through the entry prohibited area using both the corrected trajectory calculated by the parking path planning unit 12 and the coordinate information of the entry prohibited area. When the entry detector 13 determines that the corrected trajectory passes through the entry prohibited area, the parking path planning unit 12 calculates, for example, a trajectory such that the control of returning the steering angle to 0 degrees at the maximum steering angular velocity starts after a predetermined time (for example, several seconds) from the time t40. The entry detector 13 determines whether or not the new corrected trajectory passes through the entry prohibited area. The parking path planning unit 12 and the entry detector 13 repeat this processing until a corrected trajectory which does not pass through the entry prohibited area is found. The parking path planning unit 12 determines a vehicle control signal corresponding to the corrected trajectory that does not pass through the entry prohibited area as a new vehicle control signal for backward movement. As a result, it is possible to reliably prevent entry into the entry prohibited area while ensuring that the steering angle at the time of stopping immediately before the entry prohibited area is 0 degrees. Although the operation for backward movement has been described as an example, the same processing is performed for forward movement.

Figure 9:
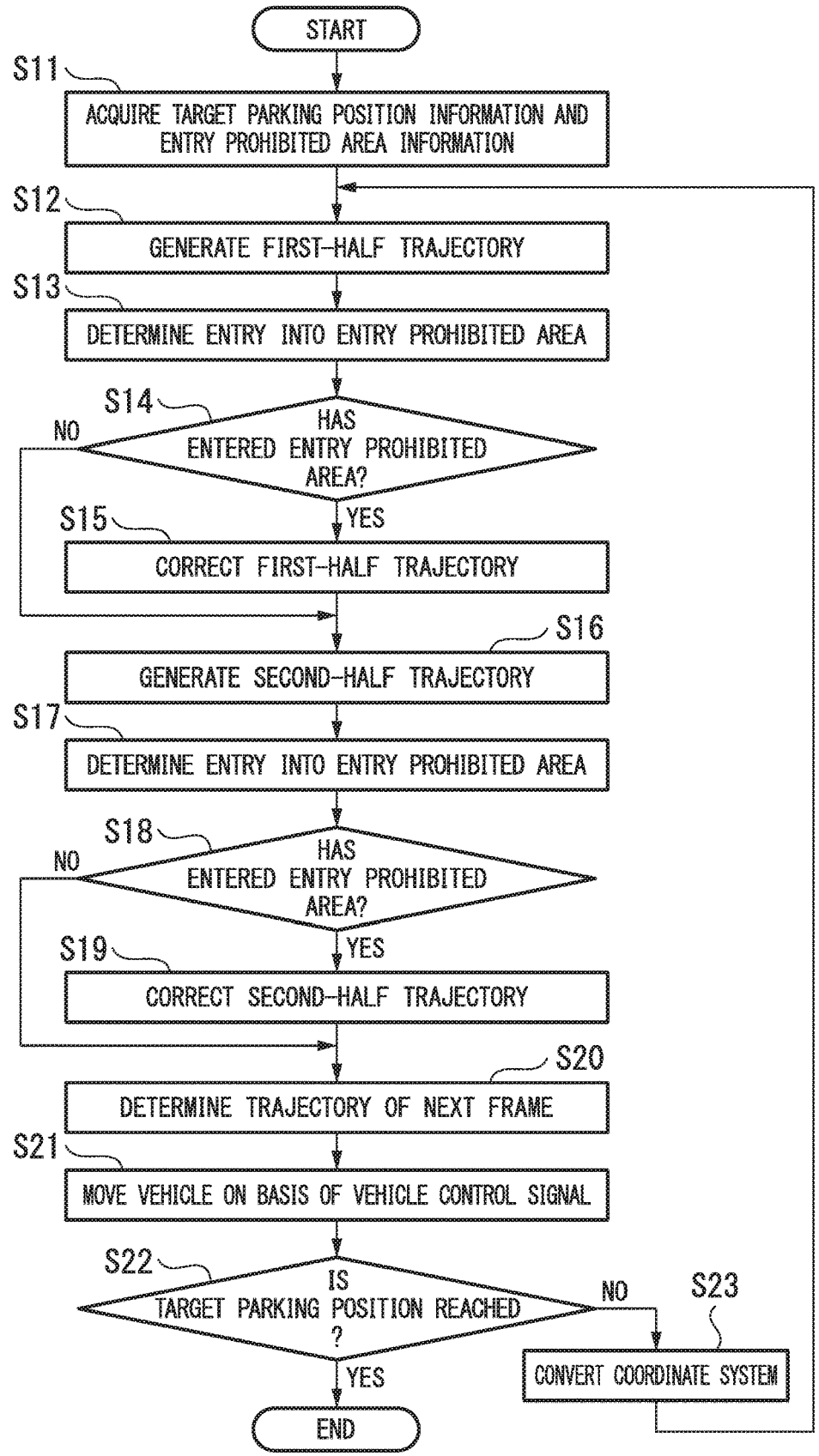
FIG. 9 is a flowchart showing an example of an automatic parking process according to the first embodiment of the present invention.

FIG. 9 is a flowchart showing an example of an automatic parking process according to the first embodiment of the present invention.

As a premise, it is assumed that a target parking position and coordinate information of an entry prohibited area are given from outside the parking support system 10. The vehicle has sensors for detecting the position or attitude of the vehicle, and the parking support system 10 can acquire position information and attitude information of the vehicle according to detection results of these sensors. For the sake of convenience of explanation, it is assumed in the following description that the speed V of forward and backward movement during automatic parking is made constant with regard to generation of a vehicle speed control signal. It is also assumed that the shift for forward movement is set as the 1st gear and the shift for backward movement is set as backing. Further, it is assumed that automatic parking processing has been started by an automatic parking start instruction operation of the driver such as pressing a button.

First, the input unit 11 acquires target parking position information and entry prohibited area information (step S11). The target parking position information includes coordinate information (Xr, Yr) of the target parking position in a coordinate system in which a predetermined position of the vehicle at present is the origin and target parking attitude information (Or) indicating an angle formed by the front direction of the vehicle when the vehicle is parked at the target parking position with respect to the current front direction of the vehicle. The entry prohibited area information includes coordinate information that defines the range of the entry prohibited area in the coordinate system in which the predetermined position of the vehicle at present is the origin. The input unit 11 acquires current position information and attitude information of the vehicle according to detection values of the sensors (cameras, etc.) of the vehicle. The input unit 11 outputs this information to the parking path planning unit 12 and the entry detector 13. Next, the parking path planning unit 12 generates a first-half trajectory (step S12). Specifically, the parking path planning unit 12 reads performance values determined considering the hardware performance such as the maximum steering angular velocity and the upper and lower limit values of the vehicle speed from the storage unit 15. Next, the parking path planning unit 12 randomly sets a target steering angle, a period of time during which the steering angle increases from 0 degrees to the target steering angle, a period of time during which the target steering angle is kept constant, and a period of time during which the steering angle returns from the target steering angle to 0 degrees as parameters within their allowable ranges and generates a plurality of steering angle control signals and a plurality of vehicle speed control signals for moving the vehicle along the first-half trajectory. Setting within the allowable ranges means, for example, setting the target steering angle to be equal to or less than the maximum steering angle or setting the speed at which the steering angle increases or decreases to be less than the maximum steering angular velocity. The parking path planning unit 12 calculates a first-half trajectory according to each of the plurality of generated vehicle control signals and calculates position information of a final arrival position and attitude information of the vehicle at the final arrival position. Calculation of the trajectory may be performed by various known methods such as calculating trajectories of a straight line, an arc, and a clothoid curve and combining the trajectories. The parking path planning unit 12 calculates a predetermined number of (for example, 10 patterns of) candidate first-half trajectories. At this time, the parking path planning unit 12 may select only first-half trajectories in which the calculated position information of the arrival position is included in a predetermined allowable range area as candidates. For example, the predetermined allowable range area is determined in advance from the positional relationship between the parking start position and the target parking position, and the storage unit 15 stores this information. The parking path planning unit 12 outputs the calculated candidate first-half trajectories to the entry detector 13.

Next, the entry detector 13 makes a determination on entry of the candidate first-half trajectories into the entry prohibited area (step S13). Specifically, the entry detector 13 determines whether or not each of the candidate first-half trajectories passes through the entry prohibited area. Upon determining that a candidate first-half trajectory enters the entry prohibited area (step S14; YES), the entry detector 13 instructs the parking path planning unit 12 to correct the candidate first-half trajectory. As described with reference to FIGS. 6 to 8, the parking path planning unit 12 generates a corrected first-half trajectory candidate such that the vehicle stops immediately before the entry prohibited area and the steering angle is 0 degrees at the time of stopping (step S15).

On the other hand, for candidate first-half trajectories that do not enter the entry prohibited area among the selected candidates (step S14; NO), the process proceeds to step S16.

Upon calculating a plurality of candidate first-half trajectories that have been confirmed not to enter the entry prohibited area, the parking path planning unit 12 subsequently generates candidate second-half trajectories (step S16). Specifically, the parking path planning unit 12 generates a plurality of candidate second-half trajectories having the arrival position of a candidate first-half trajectory as a departure position. The parking path planning unit 12 generates a plurality of second-half trajectories for each of the arrival positions of all candidate first-half trajectories in the same manner. As with the first-half trajectories, for each departure position, the parking path planning unit 12 sets arbitrary values for a target steering angle, a period of time during which the steering angle increases from 0 degrees to the target steering angle, a period of time during which the steering angle is kept constant, and a period of time during which the steering angle returns from the target steering angle to 0 degrees as parameters to generate a plurality of candidate second-half trajectories. The parking path planning unit 12 outputs the plurality of candidate second-half trajectories generated for each departure position to the entry detector 13.

Next, the entry detector 13 makes a determination on entry of each of the acquired candidate second-half trajectories into the entry prohibited area similar to the first-half trajectories (step S17). Upon determining that a candidate second-half trajectory enters the entry prohibited area (step S18; YES), the entry detector 13 instructs the parking path planning unit 12 to correct the candidate second-half trajectory. The parking path planning unit 12 generates a corrected second-half trajectory candidate such that the vehicle stops immediately before the entry prohibited area and the steering angle is 0 degrees at the time of stopping (step S19). For candidate second-half trajectories that do not enter the entry prohibited area among the plurality of candidates (step S18; NO), the process proceeds to step S20.

Upon calculating a plurality of candidate second-half trajectories that have been confirmed not to enter the entry prohibited area, the parking path planning unit 12 determines a trajectory of the next frame (step S20). Specifically, for every generated candidate second-half trajectory, the parking path planning unit 12 calculates the distance between coordinate information of the arrival position of the second-half trajectory and the coordinate information of the target parking position. The parking path planning unit 12 then selects an arrival position of a second-half trajectory for which the calculated distance is the shortest. Next, the parking path planning unit 12 selects a combination of the second-half trajectory whose arrival position is the selected arrival position and a first-half trajectory whose arrival position is the departure position of the second-half trajectory. The parking path planning unit 12 determines the selected first- and second-half trajectories as the trajectory of the next frame. The parking path planning unit 12 outputs a vehicle control signal for moving the vehicle along the determined trajectory of the next frame to the parking operation controller 14. The parking operation controller 14 controls the steering angle or the forward and backward movement speeds on the basis of the vehicle control signal to move the vehicle to the final arrival position of the next frame (step S21).

Next, the parking path planning unit 12 determines whether or not the target parking position has been reached (step S22). Specifically, the parking path planning unit 12 calculates the distance between the current position (the final arrival position of the frame) and the target parking position and compares the calculated distance with a predetermined threshold value. When the calculated distance is equal to or less than the predetermined threshold value (step S22; YES), the parking path planning unit 12 ends the automatic parking process. On the other hand, when the calculated distance exceeds the predetermined threshold value (step S22; NO), the parking path planning unit 12 converts the coordinate information of the target parking position and the entry prohibited area into that of a coordinate system according to the current position of the vehicle to further generate a trajectory of a next frame (step S23). For example, the parking path planning unit 12 converts the coordinate information of the target parking position into coordinate information in a coordinate system in which the predetermined position of the vehicle at present is the origin, an X axis is set in the travel direction of the vehicle, and a Y axis is set in the lateral direction of the vehicle. An angle formed by the orientation of the vehicle when parked at the target parking position with respect to the current orientation of the vehicle is set as attitude information at the target parking position. The same applies to the coordinate information of the entry prohibited area. Then, the parking path planning unit 12 repeats the processing from step S12 until the vehicle reaches the target parking position.

According to the present embodiment, the steering angle of the wheels is 0 degrees at the turning back position during parking and therefore it is possible to automatically perform parking at the target parking position without performing stationary turning. This makes it possible to perform automatic parking even for vehicles which cannot perform stationary turning. Automatic parking can be performed even when a vehicle which is originally capable of performing stationary turning cannot perform stationary turning due to a failure or the like. A parking path to the target parking position is planned while explicitly (or positively) considering hardware constraints (the upper and lower limit values of the steering angular velocity or the steering angle) and therefore it is possible to reliably move the vehicle to the target parking position. Automatic parking can be performed by repeating forward and backward movement a plurality of times until the target parking position is reached and therefore automatic parking is possible even for vehicles whose minimum turning radius is great and which have strong hardware constraints during automatic driving. The parking support system 10 can be installed and operated without requiring a great remodeling of the existing vehicle. An expensive actuator is not necessarily required when performing automatic parking and thus vehicle manufacturers can reduce the manufacturing costs of vehicles. Due to these features, the parking support system 10 of the present embodiment can be mounted in a wide variety of vehicle models at low cost, and it is possible to realize automatic parking of vehicles in which the parking support system 10 is mounted.

Second Embodiment

A parking support system according to a second embodiment of the present invention will now be described with reference to FIG. 10.

In the first embodiment, the parking path of the vehicle is created while explicitly (or positively) considering hardware constraints. The parking support system 10A according to the second embodiment has a configuration that can more effectively utilize the parking support system 10 of the first embodiment. Actuators for controlling the steering angle of the vehicle may sometimes not be able to provide the original performance, for example, due to heat. In such a case, a situation occurs in which the vehicle does not operate even at the maximum steering angle and steering angular velocity defined as hardware constraint conditions. In the second embodiment, to prepare for such a situation, the failure/abnormality of various actuators is detected and a parking path is planned on the basis of a hardware performance value in the situation in which the abnormality has occurred.

Figure 10:
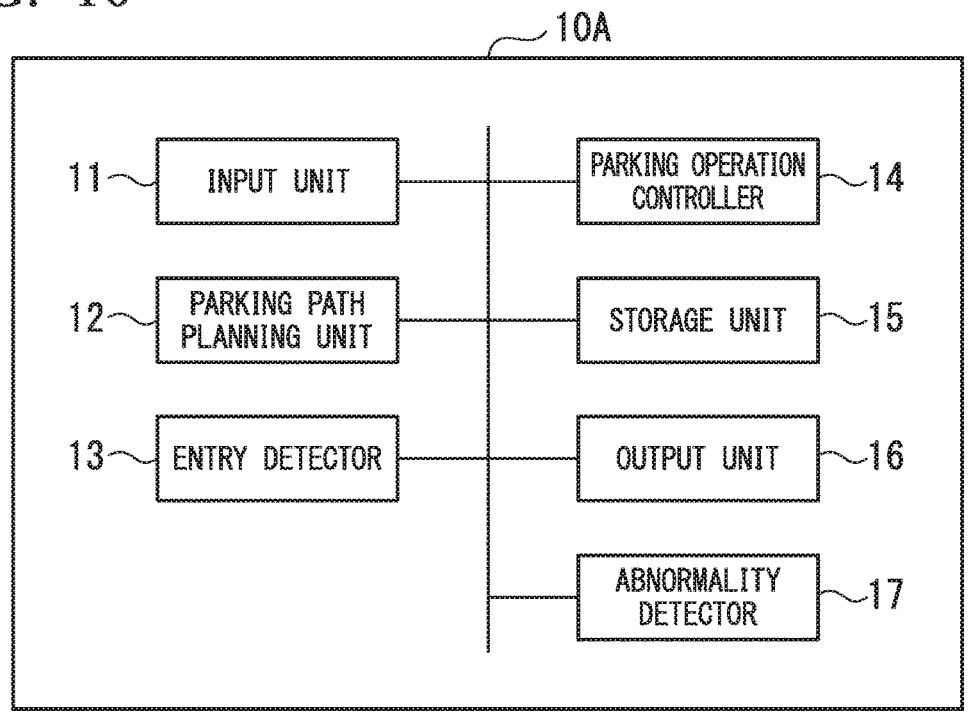
FIG. 10 is a block diagram of a parking support system according to a second embodiment of the present invention.

FIG. 10 is a block diagram of a parking support system according to the second embodiment of the present invention.

In the configuration according to the second embodiment of the present invention, the same functional components as those constituting the parking support system 10 according to the first embodiment of the present invention are denoted by the same reference signs and the descriptions thereof will be omitted. The parking support system 10A according to the second embodiment includes an abnormality detector 17 in addition to the components of the first embodiment.

The abnormality detector 17 always monitors the state of the vehicle and detects abnormality of hardware components (such as an actuator) which are controlled by a vehicle control signal among the hardware components of the vehicle.

When the abnormality detector 17 has detected an abnormality, a parking path planning unit 12 generates a first-half trajectory and a second-half trajectory or a waveform of a vehicle control signal relating to a hardware component in which the abnormality has occurred on the basis of performance values at the time of abnormality which are obtained by correcting the performance values determined considering hardware constraints to lower values. The storage unit 15 stores various performance values at the time of abnormality.

Next, an example of the automatic parking process according to the present embodiment will be described. For example, a trajectory of a first frame is calculated according to the flowchart of FIG. 9 and the vehicle is moved along the trajectory. In this process, the abnormality detector 17 detects hardware abnormality. For example, the abnormality detector 17 compares a steering angle control signal generated by the parking path planning unit 12 with an actual change in the steering angle of the wheels in response to a corresponding command value. If the difference therebetween is equal to or greater than a predetermined threshold value, the abnormality detector 17 determines that an abnormality has occurred in a hardware component for controlling the steering angle/angular velocity. Similarly, when the difference between a vehicle speed control signal generated by the parking path planning unit 12 and an actual speed at which the vehicle actually moves forward or backward in response to a corresponding command value is equal to or greater than a predetermined threshold value, the abnormality detector 17 determines that an abnormality has occurred in a hardware component for controlling the vehicle speed. For example, the abnormality detector 17 may detect the temperature of an actuator or the like for controlling the steering angle/angular velocity and detect the occurrence of abnormality according to the temperature. When the abnormality detector 17 determines that an abnormality has occurred in a hardware component for controlling the steering angle or the vehicle speed, the parking path planning unit 12 performs generation of a first-half trajectory (step S12) and generation of a second-half trajectory (step S19) according to the performance values at the time of abnormality in the trajectory planning process of a next frame. For example, when the abnormality detector 17 has detected an abnormality in a hardware component for controlling the steering angle/angular velocity, the parking path planning unit 12 reads the maximum steering angle and the maximum angular velocity in the case in which an abnormality has occurred in the hardware component for controlling the steering angle/angular velocity from the storage unit 15 to generate a waveform of a steering angle control signal and to generate a first-half trajectory and a second-half trajectory.

According to the present embodiment, even when the upper or lower limit of a performance value such as the steering angle/angular velocity has changed due to a machine failure or the like, this can be reflected in the parking path.

Third Embodiment

A parking support system according to a third embodiment of the present invention will now be described with reference to FIGS. 11 to 12.

Use of the method of the first and second embodiments, in principle, enables automatic parking for a wide variety of vehicle models. However, errors in self-position estimation or the like according to detection values of sensors increase as the number of times of turning back increases. Therefore, it is desirable that the number of times of turning back be as small as possible. As is generally known, the number of times of turning back depends on the parking start position. The third embodiment proposes a parking start position for reducing the number of times of turning back.

Figure 11:
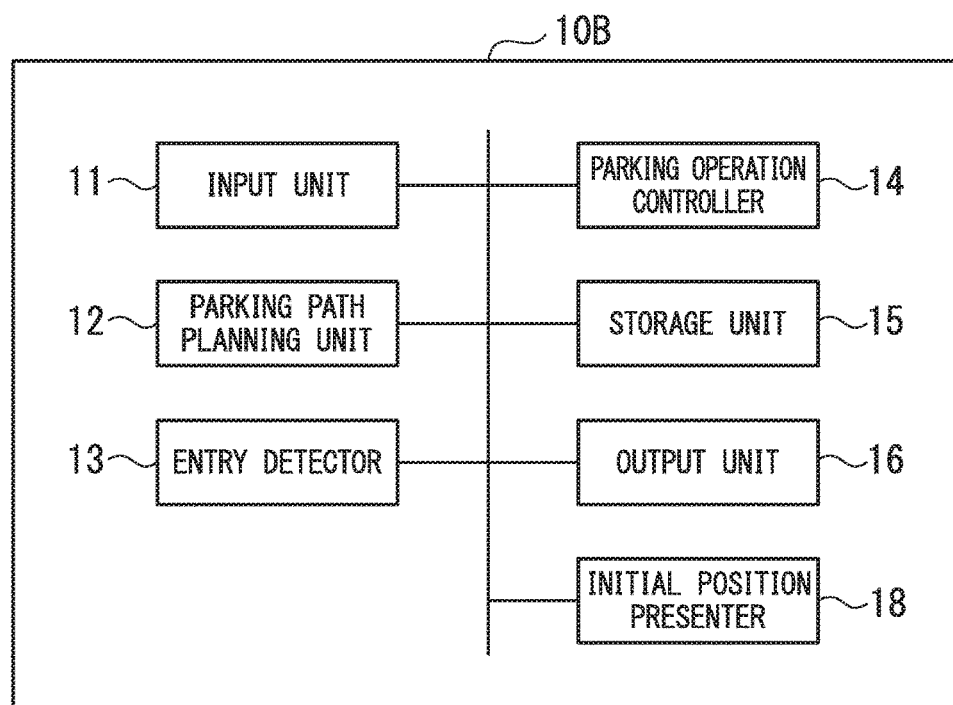
FIG. 11 is a block diagram of a parking support system according to a third embodiment of the present invention.

FIG. 11 is a block diagram of a parking support system according to the third embodiment of the present invention.

The third embodiment may be combined with any of the first embodiment or the second embodiment, but here a configuration of the third embodiment when combined with the first embodiment will be described as an example. In the configuration according to the third embodiment of the present invention, the same functional components as those constituting the parking support system 10 according to the first embodiment are denoted by the same reference signs and the descriptions thereof will be omitted. The parking support system 10B according to the third embodiment includes an initial position presenter 18 in addition to the components of the first embodiment.

The initial position presenter 18 presents a parking start position for reducing the number of times of turning back. The storage unit 15 stores initial position guide information that defines the relationship between the parking start position and the number of times of turning back.

Figure 12:
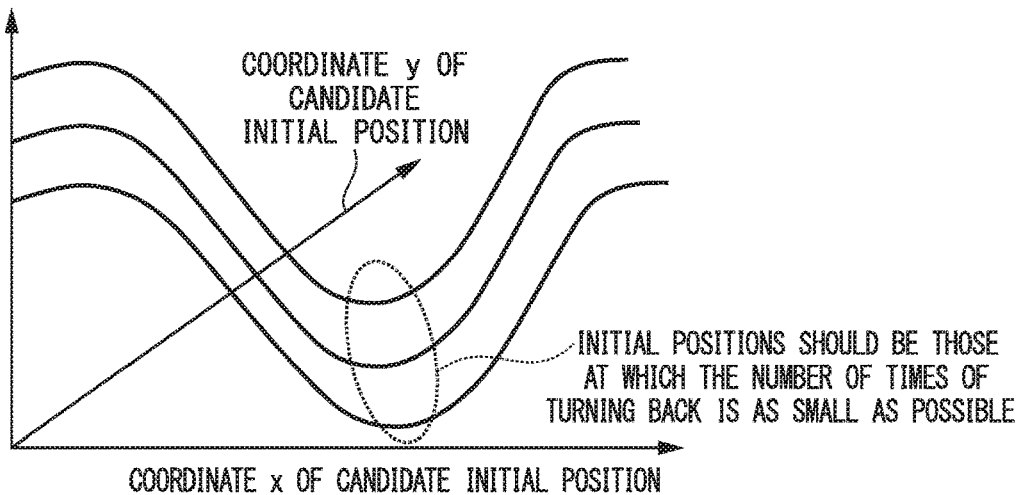
FIG. 12 is a diagram showing an example of initial position guide information according to a third embodiment of the present invention.

FIG. 12 is a diagram showing an example of initial position guide information according to the third embodiment of the present invention.

In a three dimensional graph of FIG. 12, the X axis represents the X coordinates of candidate parking start positions, the Y axis represents the Y coordinates of the candidate parking start positions, and the Z axis represents the number of times of turning back. This graph is generated, for example, using accumulated data of the number of times of turning back when repeated parking operations are performed for a target parking position while changing the parking start position in a parking lot. The position of (X, Y)=(0, 0) indicates the current position of the vehicle. The target parking position is a predetermined position. The graph of FIG. 12 shows the relationship between the parking start position and the number of times of turning back under the positional relationship between the current position and the target parking position. From this graph, it can be seen that moving the vehicle to a position of X and Y coordinates at which the value of the Z axis is the smallest and starting the automatic parking at that position can minimize the number of times of turning back for the target parking position.

Next, an example of the automatic parking process according to the present embodiment will be described. First, the input unit 11 acquires target parking position information and entry prohibited area information (step S11). Then, the initial position presenter 18 reads previously accumulated information indicating the relationship between the parking start position and the number of times of turning back from the storage unit 15. Using both the target parking position information acquired by the input unit 11 and self-position information of the vehicle according to information detected by sensors, the initial position presenter 18 corrects a coordinate system of the information indicating the relationship between the parking start position and the number of times of turning back read from the storage unit 15 in accordance with the positional relationship between the current position information of the vehicle and the target parking position. Then, the initial position presenter 18 generates and outputs a three-dimensional graph exemplified in FIG. 12 to the output unit 16. The output unit 16 displays initial position guide information (the three-dimensional graph) on a display device provided in the driver's seat. The driver refers to the three-dimensional graph and moves the vehicle to a position at which the number of times of turning back is reduced. Alternatively, the vehicle may automatically move to a position at which the number of times of turning back is reduced when the driver selects the position from the three-dimensional graph. When the vehicle arrives at a parking start position at which the number of times of turning back is reduced, the parking path planning unit 12 calculates a parking path using the parking start position according to the initial position guide information at which the number of times of turning back is the smallest as a departure position and moves the vehicle to the target position (steps S12 to S23).

According to the present embodiment, it is possible to reduce the number of times of turning back during automatic parking and to prevent an increase in self-position estimation errors. Thus, it is possible to perform automatic parking with higher accuracy in addition to the advantages of the first and second embodiments.

Fourth Embodiment

A parking support system according to a fourth embodiment of the present invention will now be described with reference to FIG. 13.

Use of the method of the first to third embodiments can realize automatic parking in which turning back is performed a plurality of times. However, since turning back is performed a plurality of times, the degree of progress of the automatic parking is unknown, which may make the driver uncomfortable. Therefore, a parking support system 10C according to the fourth embodiment has a function of presenting the progress status of the automatic parking in order to ease the driver's discomfort.

Figure 13:
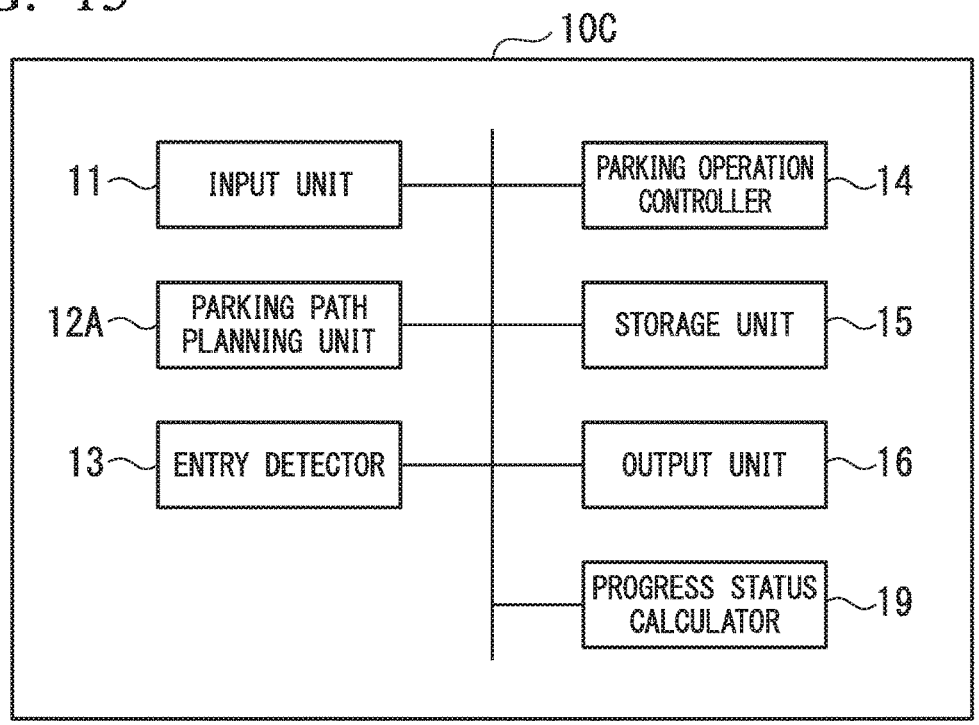
FIG. 13 is a block diagram of a parking support system according to a fourth embodiment of the present invention.

FIG. 13 is a block diagram of a parking support system according to the fourth embodiment of the present invention.

The fourth embodiment may be combined with any of the first to third embodiments, but here a configuration of the fourth embodiment when combined with the first embodiment will be described as an example. In the configuration according to the fourth embodiment of the present invention, the same functional components as those constituting the parking support system 10 according to the first embodiment are denoted by the same reference signs and the descriptions thereof will be omitted. The parking support system 10C according to the fourth embodiment includes a progress status calculator 19 in addition to the components of the first embodiment.

Each time the vehicle completes movement according to a trajectory of a frame, the progress status calculator 19 calculates the deviation between the position and attitude of the vehicle at an arrival position of the frame and the position and attitude of the vehicle at the target parking position.

Next, an example of the automatic parking process according to the present embodiment will be described. First, the processing from step S11 to step S21 in the flowchart described with reference to FIG. 9 is performed, completing the movement of a first frame. Next, the progress status calculator 19 acquires current position information and attitude information of the vehicle through the input unit 11. The progress status calculator 19 acquires position information of the target parking position and attitude information at the target parking position from the parking path planning unit 12. Next, the progress status calculator 19 calculates the degree of progress of the automatic parking using the following expression.

$$\text{Degree of progress}(q)=100-(Xr-Xq)^2-(Yr-Yq)^2-(\theta r-\theta q)^2[\%]$$

Here, Xr and Yr are an X coordinate and a Y coordinate of the position information of the target parking position and θr is the attitude information at the target parking position. q represents the frame number, and Xq, Yq, and θq are an X coordinate, a Y coordinate, and attitude information of a final arrival position of the qth frame. It can be seen that the value of "degree of progress (q)" increases as the final arrival position/attitude of the qth frame approaches the target parking position/attitude and the "degree of progress (q)" is 100% when the final arrival position/attitude coincides with the target parking position/attitude. Here, it is assumed that the progress rate is 0% if the value of this expression is less than 0. The progress status calculator 19 outputs the calculated "degree of progress (q)" to the output unit 16, and the output unit 16 displays this value on the display device of the driver's seat. For each of the second and subsequent frames, the progress status calculator 19 calculates the "degree of progress (q)" by performing the same calculation each time the movement of a second-half trajectory is completed. This allows the driver to identify the progress status of the automatic parking each time the movement of one frame is completed.

According to the present embodiment, the driver can identify the progress status of the automatic parking according to the method of the first to third embodiments. Even if parking is completed without arriving at the target parking position, the driver can see how far the vehicle is away from the target parking position upon completion of parking.

Each of the procedures of the processes of the parking support systems 10, 10A, 10B and 10C described above is stored in a computer readable recording medium in the form of a program and is performed by a computer for the parking support system 10 or the like reading and executing this program. Here, the computer readable recording medium refers to a magnetic disk, a magneto-optical disc, a CD-ROM, a DVD-ROM, a semiconductor memory, or the like. The computer program may be delivered to a computer through a communication line and may then be executed by the computer which has received the program.

The program described above may be one for realizing some of the functions described above. The program may also be a so-called differential file (differential program) which can realize the functions described above in combination with a program already recorded on the computer system.

The parking support system 10 or the like may be constituted by one computer or may be constituted by a plurality of communicatably connected computers.

Some or all of the functions of the parking support systems 10, 10A, 10B and 10C described above can be realized, for example, using hardware such as an application specific integrated circuit (ASIC), a programmable logic device (PLD), or a field-programmable gate array (FPGA).

In addition, the constituent elements in the embodiments described above can be appropriately replaced with well-known constituent elements without departing from the spirit of the present invention. The technical scope of the present invention is not limited to the above embodiments and various modifications can be made without departing from the spirit of the present invention. For example, with reference to FIG. 2(a) or the like, it has been described that control is performed such that the steering angle is 0 degrees in the initial state, increases at a constant angular velocity, is kept constant, and then decreases to 0 degrees at a constant angular velocity as an example. However, the steering angle in the initial state need not be 0 degrees. The angular velocity at which the steering angle increases/decreases need not be constant. The frame is an example of a unit path.

INDUSTRIAL APPLICABILITY

According to the parking support system, the parking support method, and the program described above, it is possible to calculate a parking path taking into consideration hardware constraints. Therefore, automatic parking is possible even for vehicles with strong hardware constraints such as the inability to perform stationary turning.

REFERENCE SIGNS LIST

10 Parking support system
11 Input unit
12 Parking path planning unit
13 Entry detector
14 Parking operation controller
15 Storage unit
16 Output unit
17 Abnormality detector
18 Initial position presenter
19 Progress status calculator

The invention claimed is:

1. A parking support system comprising a parking path planning unit configured to plan a trajectory of each unit path when moving a vehicle to a target parking position by repeating a movement of the unit path including one forward movement and one backward movement in succession and to calculate a vehicle control signal that causes the vehicle to move along the trajectory such that a steering angle of the vehicle is substantially 0 degrees at an arrival position of each of the forward movement and the backward movement; and an entry detector configured to determine entry of the unit path into an entry prohibited area, wherein the parking path planning unit is configured to change the trajectory of the unit path to a trajectory for stopping immediately before entering the entry prohibited area and to change the vehicle control signal such that the steering angle of the vehicle at a stop position immediately before the entry prohibited area in the changed unit path is substantially 0 degrees, when the entry detector has determined the entry into the entry prohibited area.

2. The parking support system according to claim 1, wherein the vehicle control signal includes a control signal to keep the steering angle constant after increasing the steering angle from a predetermined angle and then to decrease the steering angle to substantially 0 degrees in steering angle control of the forward movement and the backward movement of the unit path.

3. The parking support system according to claim 1, wherein the parking path planning unit is configured to recalculate, when the entry detector has determined the entry into the entry prohibited area, the trajectory of the unit path changed on the basis of the vehicle control signal changed and to repeat changing of the vehicle control signal until the entry detector determines that the recalculated trajectory does not enter the entry prohibited area.

4. The parking support system according to claim 1, wherein the parking path planning unit is configured to calculate the unit path and the vehicle control signal on the basis of a performance value that is able to be output by an actuator of the vehicle at a time of automatic driving of the vehicle.

5. The parking support system according to claim 4, wherein the parking path planning unit is configured to calculate a plurality of candidate unit paths in cases where the vehicle is moved within a range of upper and lower limit values of the performance value that is able to be output by the actuator of the vehicle at the time of automatic driving of the vehicle and to select a unit path which has the shortest distance from an arrival position of the unit path to the target parking position from the plurality of unit paths.

6. The parking support system according to claim 1, further comprising an abnormality detector configured to detect an abnormality in a hardware component relating to the vehicle control signal among hardware components of the vehicle, wherein the parking path planning unit is configured to calculate the unit path and the vehicle control signal on the basis of a performance value of the hardware component at a time of the abnormality in the hardware component detected by the abnormality detector.

7. The parking support system according to claim 6, wherein the abnormality detector is configured to detect that an abnormality has occurred in the hardware component on the basis of at least one of a deviation between a steering angle control signal included in the vehicle control signal and an actual steering angle and a deviation between a vehicle speed control signal and an actual vehicle speed being equal to or greater than a corresponding threshold value set for each of the deviations, and the parking path planning unit is configured to calculate the unit path on the basis of a performance value of the hardware component at the time of the abnormality in the hardware component detected by the abnormality detector.

8. The parking support system according to claim 1, wherein the parking path planning unit is configured to calculate the unit path using a parking start position that has the smallest number of times of turning back among a plurality of the parking start positions according to initial position guide information defining a relationship between the parking start position and the number of times of turning back, as a departure position.

9. The parking support system according to claim 1, further comprising a progress status calculator configured to calculate:

a deviation between a position of the vehicle at the arrival position of the unit path and a position of the vehicle at the target parking position each time the vehicle completes movement according to the unit path; and a deviation between an angle formed by an orientation of the vehicle when the vehicle has reached the arrival position of the unit path with respect to an orientation of the vehicle when the vehicle has started to park and an angle formed by an orientation of the vehicle when the vehicle has reached the target parking position with respect to the orientation of the vehicle, when the vehicle has started to park.

10. The parking support system according to claim 1, wherein the parking path planning unit is configured to repeatedly plan a subsequent unit path having the arrival position of the unit path as a departure position until a difference between a position of the vehicle at an arrival position of a unit path and the target parking position is within a predetermined range and to calculate a parking path including one or a plurality of the unit paths.

11. A parking support system comprising:

a parking path planning unit configured to generate a steering angle control signal for controlling change of a steering angle of a vehicle when moving the vehicle to a target parking position by repeating movement of a unit path including one forward movement and one backward movement in succession; and an entry detector configured to determine entry of the unit path into an entry prohibited area, wherein the parking path planning unit is configured to calculate a steering angle control signal including a trapezoidal waveform such that the steering angle in each of the forward movement and the backward movement starts at substantially 0 degrees and ends at substantially 0 degrees, and wherein the parking path planning unit is configured to change the trajectory of the unit path to a trajectory for stopping immediately before entering the entry prohibited area and to change the steering angle control signal such that the steering angle of the vehicle at a stop position immediately before the entry prohibited area in the changed unit path is substantially 0 degrees, when the entry detector has determined the entry into the entry prohibited area.

12. A parking support system comprising:

a parking path planning unit configured to plan a trajectory of each unit path when moving a vehicle to a target parking position by repeating a movement of the unit path including one forward movement and one backward movement in succession; and an entry detector configured to determine entry of the unit path into an entry prohibited area, wherein the parking path planning unit is configured to repeatedly plan a subsequent unit path having an arrival position of the unit path as a departure position until a difference between a position of the vehicle at an arrival position of a unit path and the target parking position is within a predetermined range, and wherein the parking path planning unit is configured to change the trajectory of the unit path to a trajectory for stopping immediately before entering the entry prohibited area, when the entry detector has determined the entry into the entry prohibited area.

13. A parking support method comprising:

planning a trajectory of each unit path when moving a vehicle to a target parking position by repeating a movement of the unit path including one forward movement and one backward movement in succession and calculating a vehicle control signal for causing the vehicle to move along the trajectory such that a steering angle of the vehicle is substantially 0 degrees at an arrival position of each of the forward movement and the backward movement;

determining entry of the unit path into an entry prohibited area; and changing the trajectory of the unit path to a trajectory for stopping immediately before entering the entry prohibited area and changing the vehicle control signal such that the steering angle of the vehicle at a stop position immediately before the entry prohibited area in the changed unit path is substantially 0 degrees, when the entry into the entry prohibited area is determined.

14. A non-transitory computer readable medium storing a program that causes a computer for a parking support system to function as:

a parking path planning unit configured to plan a trajectory of each unit path when moving a vehicle to a target parking position by repeating a movement of the unit path including one forward movement and one backward movement in succession and to calculate a vehicle control signal for causing the vehicle to move along the trajectory such that a steering angle of the vehicle is substantially 0 degrees at an arrival position of each of the forward movement and the backward movement; and an entry detector configured to determine entry of the unit path into an entry prohibited area, wherein the parking path planning unit is configured to change the trajectory of the unit path to a trajectory for stopping immediately before entering the entry prohibited area and to change the vehicle control signal such that the steering angle of the vehicle at a stop position immediately before the entry prohibited area in the changed unit path is substantially 0 degrees, when the entry detector has determined the entry into the entry prohibited area.

* * * * *